W. E. SCHMIDT 2,709,110

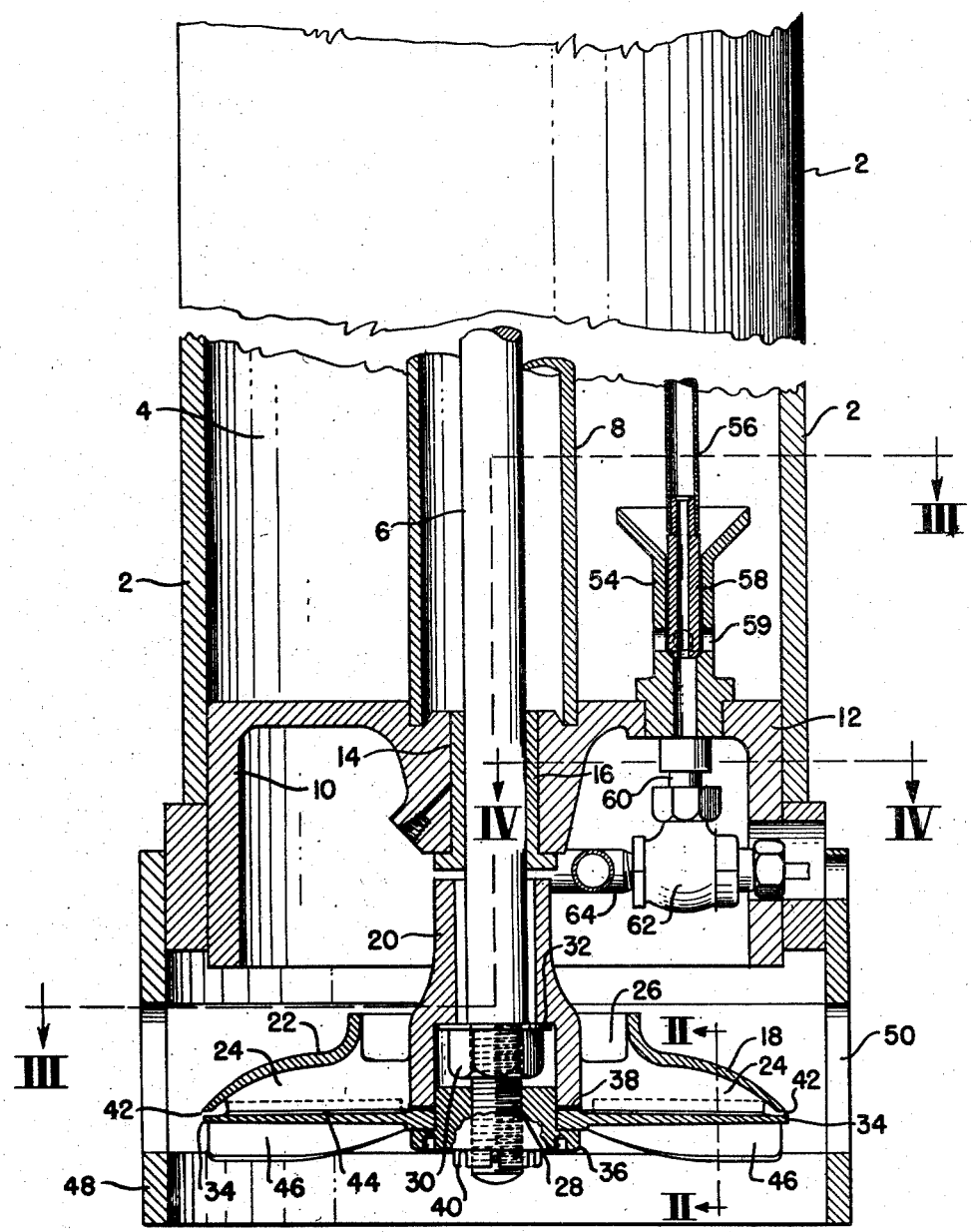
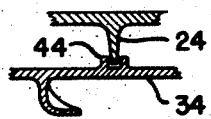
FIG. 1
FIG. 2
INVENTOR.
WILLIAM E. SCHMIDT
BY
Donald G. Dalton May 24, 1955

LIQUID SPRAYING APPARATUS

Filed June 29, 1951

*INVENTOR.*
WILLIAM E. SCHMIDT
BY
Donald G. Dalton

United States Patent Office 2,709,110
Patented May 24, 1955

2,709,110

LIQUID SPRAYING APPARATUS

William E. Schmidt, Chicago, Ill., assignor to United States Steel Corporation, a corporation of New Jersey Application June 29, 1951, Serial No. 234,371

8 Claims. (Cl. 299—63)

This invention relates to a liquid spraying apparatus and more particularly to such an apparatus for coating the interior of an ingot mold. The apparatus is an improvement on that disclosed in Hadley Patent No. 2,151,100, dated March 21, 1939. The Hadley apparatus, while suitable for coating molds with tar is found to be unsatisfactory for coating molds with various other types of coating. The Hadley apparatus does not satisfactorily atomize the liquid coating material and project it at sufficiently high velocity to cause it to adhere to and completely cover the inside wall of the mold.

It is therefore an object of my invention to provide liquid spraying apparatus that will satisfactorily atomize liquid coating material and deliver it at sufficiently high velocity to adhere to the material to be coated.

This and other objects will be more apparent after referring to the following specification and attached drawings, in which:

Figure 1 is a sectional view showing a preferred embodiment of my invention;

Figure 2 is a sectional view taken on the line II—II of Figure 1;

Figure 4:
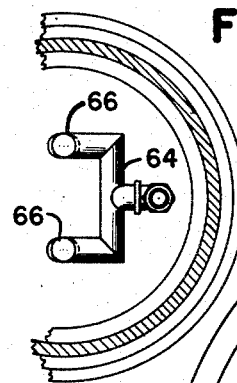
Figure 4 is a sectional view taken on the line IV—IV of Figure 1.
Figure 3:
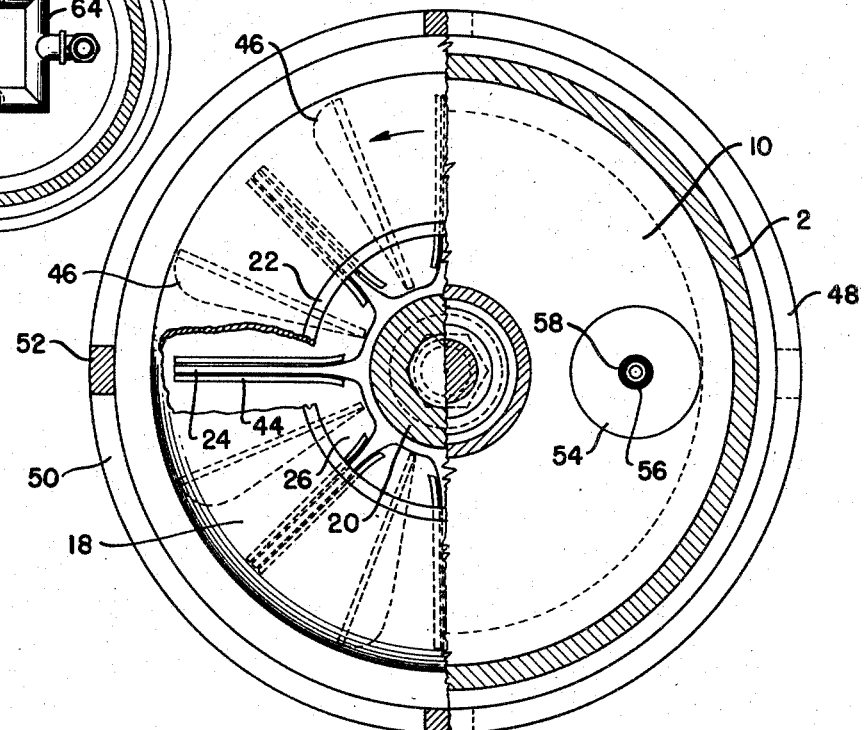
Figure 3 is a sectional view taken on the line III—III of Figure 1.

Referring more particularly to Figures 1 to 4 of the drawings, the reference numeral 2 indicates a casing having a liquid reservoir 4 therein which contains the coating material. A rotatable shaft 6 is mounted in the casing within a hollow tubular member 8 which separates it from the coating material. The bottom of the reservoir 4 is formed by a member 10 having a downwardly extending annular flange 12 and a bearing support 14 for receiving a bearing 16 through which passes the lower end of rotatable shaft 6. A spinner assembly 18 is fastened to the lower end of shaft 6 for rotation therewith. The spinner assembly has a hub 20 surrounding and keyed to the lower end of the shaft 6. A curved hood member 22 which is integral with the hub 20 has a plurality of vanes 24 fastened thereto. The vanes 24 extend in a generally radial position and may be exactly radial as shown, curved, or extend outwardly in a plane other than an exact radial plane. Openings 26 are provided between the hood member 22 and the hub 20 for a purpose which will appear later. The lower end of the shaft 6 is threaded at 28 and a nut 30 is threaded thereon against a shoulder 32 in the hub 20 to hold it in position. A bottom plate member 34 of approximately the same outside diameter as the hood 22 is held in position adjacent the hood 22 by means of a shouldered nut 36 threaded onto the threaded portion 28. A shim 38 is provided between the bottom of the hub 20 and bottom plate 34 to provide for adjustment. The nut 36 is locked in position by a castellated nut 40. It will be seen that the hood member 22 extends from a point adjacent the outer periphery of the bottom member 34 inwardly and upwardly toward the shaft 6 and that the members are slightly spaced apart around their outer periphery to provide an orifice 42. The bottom member 34 is provided with several pairs of upwardly extending ribs 44 which provide an opening for receiving the vanes 24. The size of the orifice or peripheral opening 42 may be varied by changing the thickness of shim 38. A plurality of generally radial extending vanes 46 are fastened to the bottom of the bottom member 34 in planes between the vanes 24. A guard 48 is fastened to the lower end of casing 2 and extends downwardly around the spinner assembly 18 to a position below the vanes 46, thus serving to protect the spinner assembly from damage. The guard 48 has a plurality of openings 50 therein separated by narrow ribs 52. The openings 50 extend above and below the horizontal plane of the orifice 42. A plunger valve 54, which opens and closes the flow of liquid from the tank 4 to the spinner assembly, is fastened to the tank bottom 10. A hollow rod 56 having a valve plug 58 attached to its lower end passes through the reservoir 4. Valve 54 has a plurality of holes 59 therein which are closed by the valve plug 58 when in its lower position. Liquid from the valve 54 passes through a conduit 60 to a valve 62 which controls the rate of flow to the spinner 18. A forked liquid feed pipe 64 is fastened to the outlet of valve 62 and has two discharge legs 66 spaced 180° apart which deliver liquid through the openings 26.

The means for rotating and lowering the rod 56 and the means for rotating the shaft 6 are generally the same as those of the Hadley patent and the operation of the device is also generally the same as that of the Hadley device. When the shaft 6 and spinner 18 are rotating and the valves 54 and 62 are open coating liquid will flow through the legs 66 to the spinner 18. Rotation of the spinner causes the liquid to accumulate in the compartments between the vanes 24 and the centrifugal force builds up hydraulic pressure to force the liquid in a uniform spray through the continuous peripheral orifice 42 outwardly through the openings 50 against the side of the mold being coated. This hydraulic pressure is also augmented by the air pressure being built up by rotating vanes 24. The vanes 46 help to create an air flow upwardly to further help in atomizing the liquid. Feeding of the liquid through the spaced apart legs 66 provides even liquid distribution to prevent unbalancing of the spinner. The top of the bottom member 34 is preferably sloped downwardly and outwardly to permit drainage of fluid from the spinner. Air may be delivered through the opening in tube 56 to clean out the valves and spinner assembly and/or to aid in the spraying operation. Some of the mold coating materials have a tendency to precipitate out of solution and in order to prevent this precipitation, means for agitation is provided, such as air nozzles in the bottom of the reservoir 4 which keep the liquid in a constant state of whirling agitation.

Figure 5:
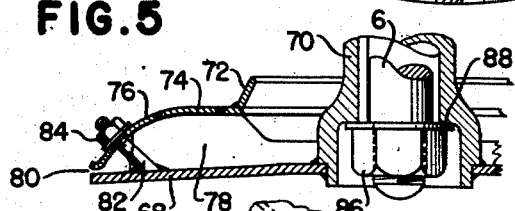
Figure 5 is a fragmentary sectional view showing a second embodiment of my invention.
Figure 6:
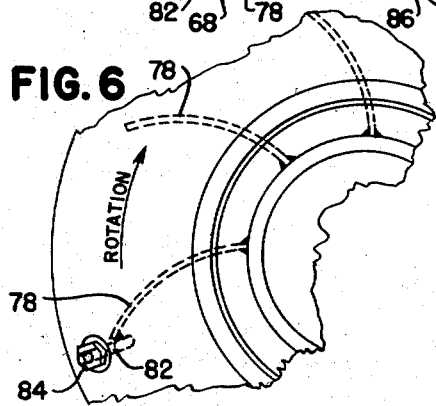
Figure 6 is a fragmentary top plan view of Figure 5.

Figures 5 and 6 show a second embodiment of the spinner of my invention in which the bottom plate member 68 is rigidly attached to a hub 70 and in which the hood member is made up of a conical plate 72 welded to a top plate 74 which in turn is welded to an end plate 76. A plurality of curved radial vanes 78 are welded to and extend between the hood member and bottom member 68. A peripheral orifice 80 is provided between the hood and bottom members. A plurality of spaced apart studs 82 are welded to the bottom member 68 and pass upwardly at an angle through openings in the plate 76. The vanes 78 do not extend completely to the periphery of the hood and bottom plate members so that the size of the orifice 80 may be adjusted by tightening the nuts 84 on the bolts 82. The hub 70 is keyed to the shaft 6 and held in place thereon by means of a nut 86 threaded on the shaft 6 and bearing against a shoulder 88 on the hub.

Figure 7:
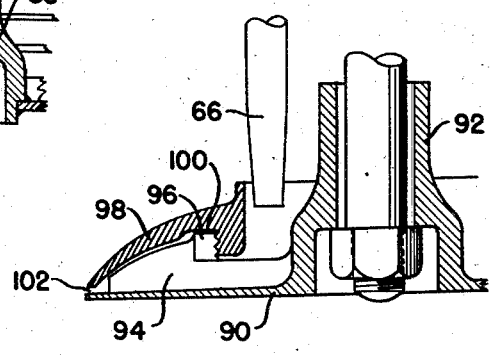
Figure 7 is a fragmentary sectional view showing another embodiment of my invention.

Figure 7 shows another embodiment of the spinner of my invention in which the bottom plate 90 is made integral with a hub 92 and in which vanes 94 are attached to the bottom member 90. A threaded ring member 96 is attached to the vanes 94 and a hood member 98 is threaded into the ring 96. A shim 100 is provided between the ring member 96 and hood member 98 to provide adjustment for the size of the orifice 102.

While several embodiments of my invention have been shown and described it will be apparent that other adaptations and modifications may be made without departing from the scope of the following claims.

I claim:

1. Liquid spraying apparatus comprising a casing, a liquid reservoir in said casing, a rotatable shaft mounted in said casing with one end extending downwardly through the bottom of said reservoir, and a spinner mounted on said shaft below said reservoir, said spinner including a bottom member, a hood member extending from a position adjacent the outer periphery of said bottom member inwardly and upwardly toward said shaft away from said bottom member, said members being spaced apart vertically around their outer peripheries a short distance to provide a peripheral orifice, a plurality of generally radially extending vanes extending between said members, means for delivering liquid from said reservoir to said spinner, and a plurality of generally radially extending vanes fastened to the bottom of said bottom member.

2. Liquid spraying apparatus according to claim 1 having a guard fastened to the lower end of said casing and extending downwardly around said spinner to a position below the vanes on the bottom of said bottom member, said guard having a plurality of openings therein in the same plane as said orifice, said openings being of substantially greater height than said orifice.

3. Liquid spraying apparatus comprising a casing, a liquid reservoir in said casing, a rotatable shaft mounted in said casing with one end extending downwardly through the bottom of said reservoir, and a spinner mounted on said shaft below said reservoir, said spinner including a bottom member, a hood member extending from a position adjacent the outer periphery of said bottom member inwardly and upwardly toward said shaft away from said bottom member, said members being spaced apart vertically around their outer peripheries a short distance to provide a peripheral orifice, a plurality of generally radially extending vanes extending between said members, means for delivering liquid from said reservoir to said spinner, and a plurality of generally radially extending vanes fastened to the bottom of said bottom member.

4. Liquid spraying apparatus comprising a casing, a liquid reservoir in said casing, a rotatable shaft mounted in said casing with one end extending downwardly through the bottom of said reservoir, and a spinner mounted on said shaft below said reservoir, said spinner including a substantially horizontal bottom member, a hood member extending from a position adjacent the outer periphery of said bottom member inwardly and upwardly toward said shaft away from said bottom member, said members being spaced apart vertically around their outer peripheries a short distance to provide a peripheral horizontal orifice, a plurality of generally radially extending vanes extending between said members, and means for delivering liquid from said reservoir to said spinner.

5. Liquid spraying apparatus according to claim 4 having the inner part of said hood member and said shaft spaced apart to provide an opening for receiving said liquid, and means for changing the size of said orifice.

6. Liquid spraying apparatus according to claim 4 having means for changing the size of said orifice, a plurality of generally radially extending vanes fastened to one of said members, and a plurality of pairs of ribs fastened to the other of said members to provide openings to receive said vanes.

7. Liquid spraying apparatus according to claim 4 including a plurality of spaced apart studs welded to the said bottom member adjacent its periphery, said hood member having spaced openings adjacent its periphery, said studs passing upwardly and outwardly through said openings in said hood member, said studs being threaded on their upper ends, a nut engaging the threads on each of said studs and bearing against the top of said hood member.

8. Liquid spraying apparatus according to claim 4 having the said vanes fastened to the bottom member, a threaded ring member attached to the upper end of the vanes, a shim between the ring member and hood member, and threads on said hood member engaging the threads of said ring member.

References Cited in the file of this patent

UNITED STATES PATENTS

| | | |
|---|---|---|
| 2,003,575 | Bowen | June 4, 1935 |
| 2,151,100 | Hadley | Mar. 21, 1939 |
| 2,251,457 | Lee | Aug. 5, 1941 |
| 2,545,490 | Norris | Mar. 20, 1946 |

FOREIGN PATENTS

| | | |
|---|---|---|
| 985,106 | France | Mar. 7, 1951 |